Dec. 27, 1960    C. E. WHETSTONE    2,966,088
RECIPROCATING CUTTER ACTUATED BY HYDRAULICALLY OPERATED LEVER
Filed June 29, 1956

INVENTOR.
CECIL E. WHETSTONE
BY
ATTORNEY

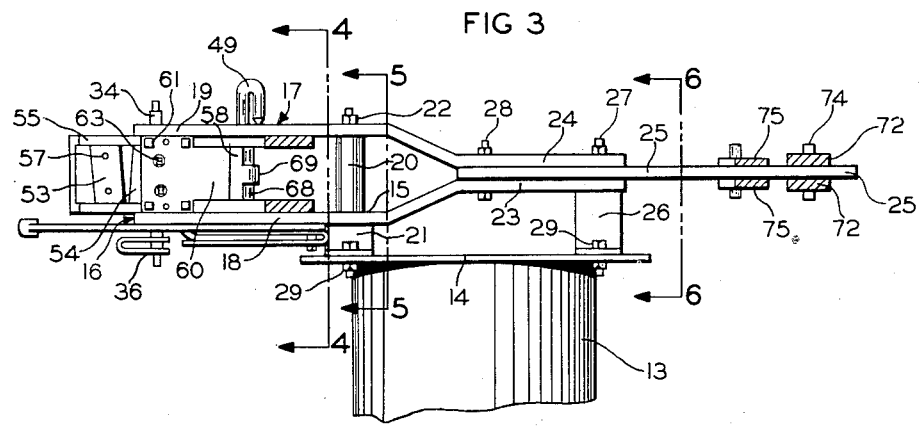
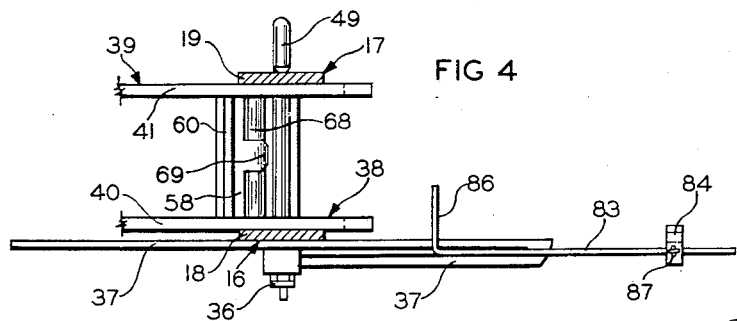
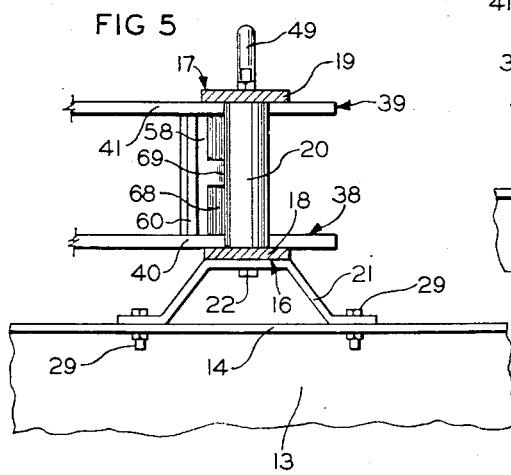
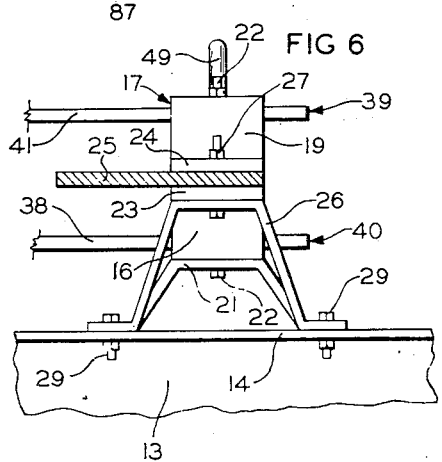

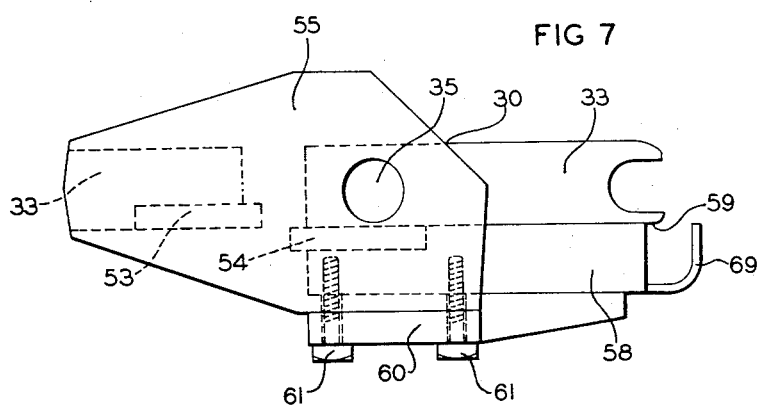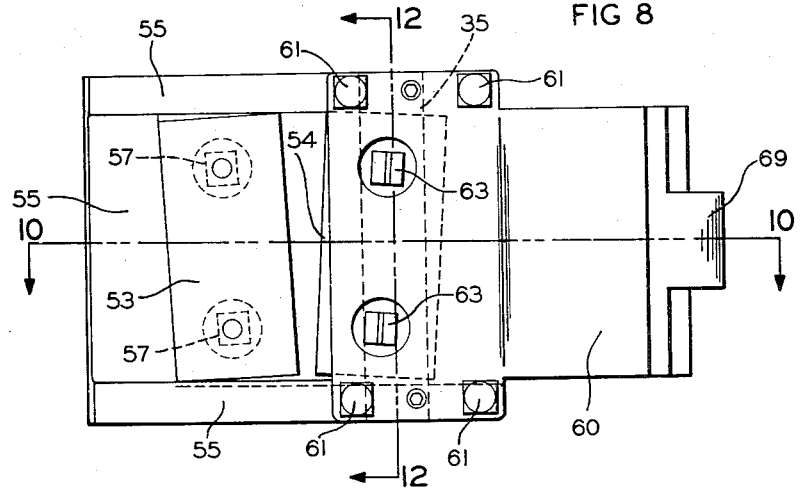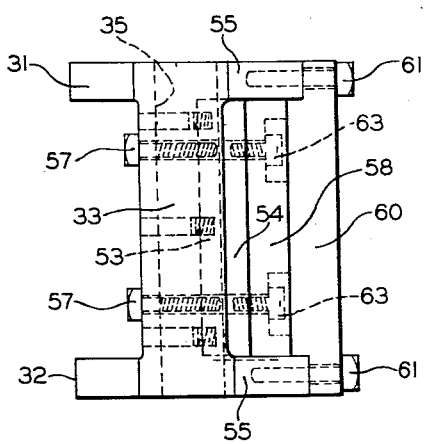

Dec. 27, 1960 C. E. WHETSTONE 2,966,088
RECIPROCATING CUTTER ACTUATED BY HYDRAULICALLY OPERATED LEVER
Filed June 29, 1956 4 Sheets-Sheet 4
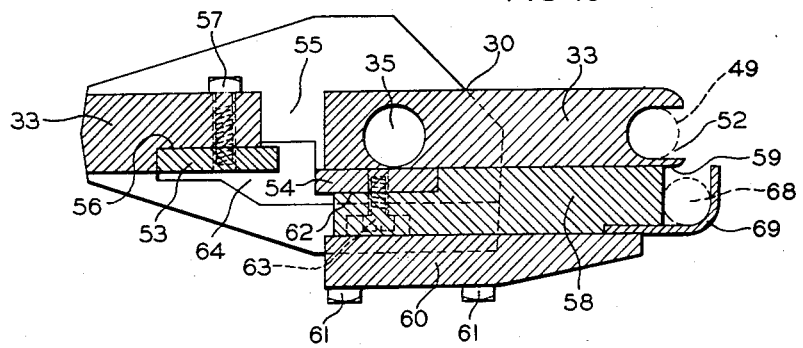
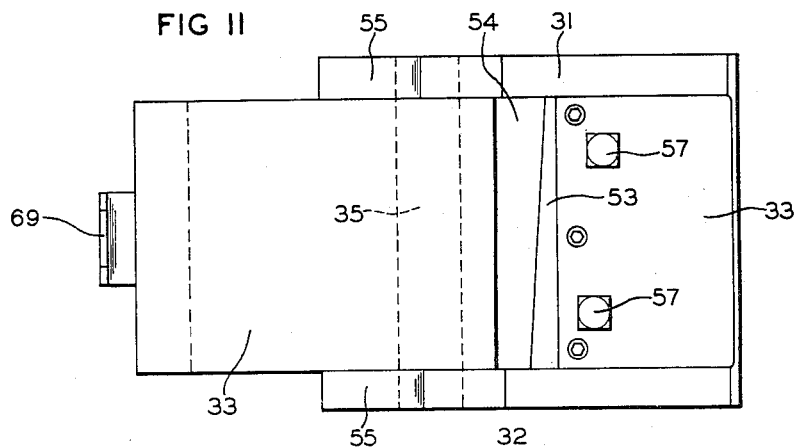
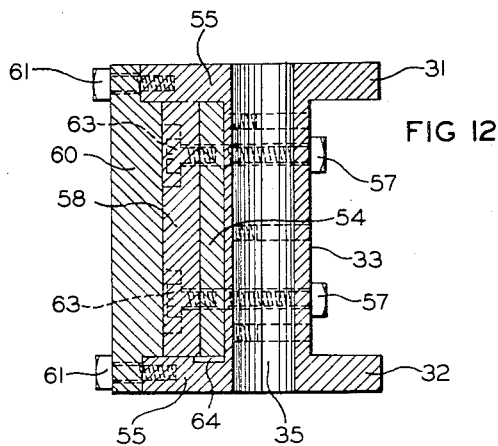
INVENTOR.
CECIL E. WHETSTONE
BY
ATTORNEY

# United States Patent Office 2,966,088
Patented Dec. 27, 1960

2,966,088

RECIPROCATING CUTTER ACTUATED BY HYDRAULICALLY OPERATED LEVER

Cecil E. Whetstone, Winona, Minn., assignor to Hossfeld Manufacturing Company, Winona, Minn., a corporation of Minnesota Filed June 29, 1956, Ser. No. 594,961

4 Claims. (Cl. 83—634)

My invention relates to improvements in cutting tools of the type having a fixed shearing blade and a cooperating movable shearing blade for cutting metal bars, rods and the like.

An object of this invention is to provide a shearing tool that is fluid-operated to produce cutting action and automatically returned to an inoperative position.

Another object of this invention is to provide a shearing tool that is powerful, of rugged structure, and easy to operate.

Other objects of this invention will be apparent from the following description, reference being had to the drawings.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 3 is a view corresponding to Fig. 2, with the exception that certain parts have been sectioned on the line 3—3 of Fig. 2;

Figures 1, 2:
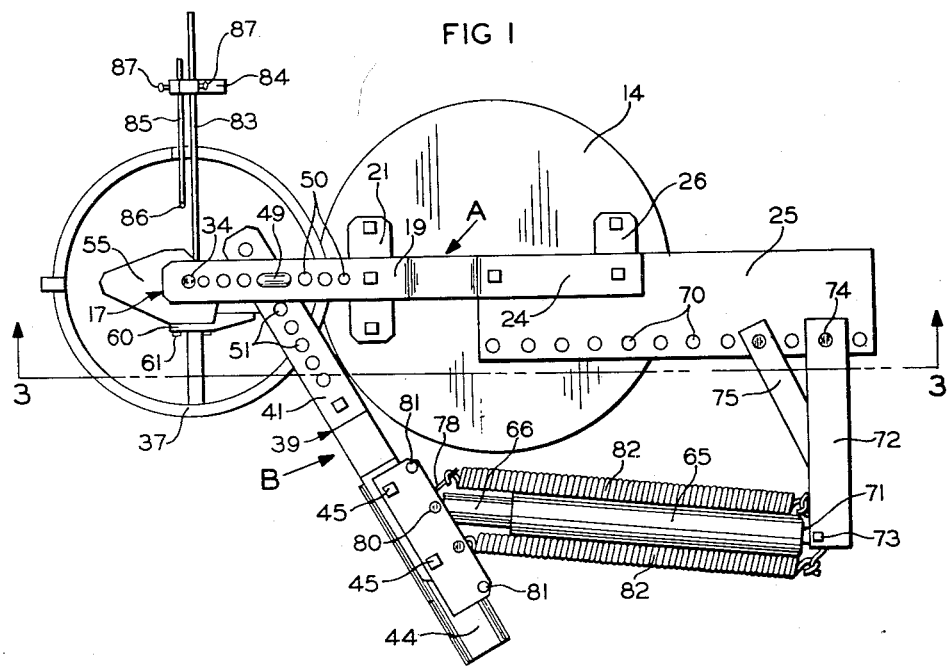
Fig. 1 is a plan view of the improved shearing tool.
Fig. 2 is a side elevational view of the same.

Figs. 4, 5 and 6 are views, on an enlarged scale, partly in elevation and partly in section taken on the lines 4—4, 5—5 and 6—6 of Fig. 3, respectively;

Fig. 7 is a plan view of the improved shearing tool, on an enlarged scale, removed from its mount and operating mechanism;

Fig. 8 is a left-hand side elevational view of the shearing tool, as shown in Fig. 7;

Fig. 9 is a front end view of the same;

Fig. 10 is a sectional view taken on the line 10—10 of Fig. 8;

Fig. 11 is a right-hand side elevational view of the shearing tool as shown in Fig. 7; and Fig. 12 is a sectional view taken on the line 12—12 of Fig. 8.

The mount for the improved shearing tool is on a table 13 of the pedestal type, only fragmentarily shown, and having a round top 14. This table 13, will, in actual use, be rigidly secured to a floor.

The mount for the improved shearing tool is a stationary frame A that includes a lower bar 16 and an upper bar 17. These bars 16 and 17 are flat in the same vertical plane and identical, the one with the other. The front end sections 18 and 19 of the bars 16 and 17, respectively, are parallel and held spaced apart, at their rear end portions, by a sleeve 20. The lower bar section 18 rests on a leg bracket 21 directly under the spacing sleeve 20. A nut-equipped bolt 22 extends through the spacing sleeve 20 and aligned holes in the bar sections 18 and 19 and in the leg bracket 21 and holds bar sections 18 and 19 and leg bracket 21 rigidly clamped together.

The bars 16 and 17, just rearwardly of the spacing sleeve 20, are in rearwardly converging relation and closely position the rear end sections 23 and 24 of the bars 16 and 17, respectively, in parallel arrangement. A flat plate 25 is inserted between the bar sections 23 and 24 and acts as a spacer therefor.

The lower bar section 23 at its rear end portion rests on a transverse leg bracket 26, similar to the leg bracket 21. A nut-equipped bolt 27 extends through aligned holes in the bar sections 23 and 24 and in the plate 25 and rigidly connect the same. A second nut-equipped bolt 28 extends through aligned holes in the bar sections 23 and 24, the plate 25 and the leg bracket 26 and rigidly connect the same. The leg brackets 21 and 26 rest on the table top 14 and are rigidly secured thereto by nut-equipped bolts 29.

The improved shearing tool includes a heavy cast body member 30 comprising an upper plate 31, a lower plate 32 and a thick web 33 that extends centrally and longitudinally between said plates and rearwardly thereof. The body member 30 is interposed between the front end portions of the bar sections 18 and 19. A long pin 34 extends through aligned holes 35 in the bar sections 18 and 19, the plates 31 and 32 and the web 33 of the body member 30. This pin 34 rests on a supporting member 36 attached to a horizontally disposed supporting ring 37 attached to the lower bar section 18.

A swinging frame B, substantially identical with the stationary frame A, also includes a lower bar 38 and an upper bar 39. The inner sections 40 and 41 of the bars 38 and 39, respectively, are parallel and their inner end portions are in converging relation to bring the outer sections 42 and 43 of the bars 38 and 39, respectively, into close parallel relation. A flattened tubular member 44 extends longitudinally between the bar sections 42 and 43, acts as a spacer therefor and is rigidly secured thereto by a pair of nut-equipped bolts 45. The flattened tubular member 44 affords a socket 46 to removably hold a bar, not shown, for manually operating the movable frame B. A spacing sleeve 47 extends between the bar sections 40 and 41 and a nut-equipped bolt 48 extends through said sleeve and aligned holes in the bar sections 40 and 41 and rigidly connects the same. The free end portions of the bar sections 40 and 41 extend between the bar sections 18 and 19 and are pivoted thereto, to swing in a horizontal plane, by a pivot pin 49. This pivot pin 49 extends through one of the axially aligned pairs of holes 50, that are spaced longitudinally in the bars 18 and 19, and one of the axially aligned pairs of holes 51 that are spaced longitudinally in the bar sections 40 and 41.

In the inner end of the web 33 is an upright notch 52 through which the pivot pin 49 extends and holds the shearing tool from moving pivotally on the pin 34. In other words, the pins 34 and 49 rigidly hold the shearing tool relative to the stationary frame A. The shearing tool further includes a fixed rectangular shearing blade 53 and a cooperating movable rectangular shearing blade 54. Extending transversely through the web 33 the full height thereof is a work passageway 55.

The section of the web 33 forwardly of the work passageway 55, on its inner side, is chamfered to afford a seat 56 for the fixed shearing blade 53. The blade 53 is detachably secured to the web 33 by machine screws 57 with its cutting edge portion extending into the work passageway 55. The movable shearing blade 54 is mounted on a rectangular carrier 58 which, in turn, is slidably mounted in a way 59. This way 59 is formed by the plates 31 and 32, the web 33 and a side plate 60. The side plate 60 is chamfered at its ends and inner side to receive the longitudinal edge portions of the plates 31 and 32, to which plates the side plate 60 is detachably secured by machine screws 61.

The inner side of the carrier 58 at the front thereof is chamfered to afford a seat 62 for the movable shearing blade 54. This blade 54 is detachably secured by machine screws 63 to the carrier 58 and its cutting edge portion extends forwardly of said carrier and into the work passageway 55. It is important to note that the backs of the two seats 56 and 62 are in upwardly diverging relation and hold the shearing blades 53 and 54 with their cutting edges in upwardly diverging relation to produce a shearing action. Formed in the lower plate 32 is a passageway 64 to afford clearance for the lower end portions of the shearing blades 53 and 54, to facilitate the mounting of said blades in their seats or the removal therefrom and also affords an escape for foreign matter.

The carrier 58 is operated by the lever-acting frame B and said frame in turn is operated by a cylinder 65 and a piston 66 to move the carrier 58 and the shearing blade 54 toward the fixed shearing blade 53 and thus bring the movable blade into shearing relation with fixed blade 53 to cut a bar, a rod or other piece of work extending between said shearing blades and through the work passageway 55. The piston 66 is operated by a fluid introduced into the cylinder 65 through a hose 67 leading from any suitable source of supply under pressure.

The carrier 58 is moved forwardly by a post 68 that extends between the bar sections 18 and 19 and engages the rear end of said carrier. This post 68 is secured to the bar sections 18 and 19 by mounting the reduced end portions in holes in said bar sections. The carrier 58 is attached to the post 68 to be retracted thereby during return movement of the swinging frame B by a keeper 69 in the form of an L. This keeper 69 is rigidly secured to the carrier 58 and extends past one side of the post 68 and across the back thereof.

Referring again to the plate 25, which extends materially outwardly of the bar sections 23 and 24 on the same side of the frame A as the swinging frame B and has an outer longitudinal edge portion. This plate 25 has therein a row of holes 70 parallel to said bar sections. The cylinder 65, at its outer end, has an eye extension 71 that extends between the outer end portions of a pair of flat bars 72, and is pivotally attached thereto by a nut-equipped bolt 73. These bars 72, at their inner end portions, extend one on each side of the plate 25 and are attached, perpendicular thereto, by a pin 74 that extends through aligned holes in said bars and one of the holes 70. The bars 72 are rigidly held relative to the plate 25 by a pair of flat brace bars 75, between which the plate 25 extends. These brace bars 75 are attached to the plate 25 by a pin 76 which extends through aligned holes in said brace bars and one of the holes 70 in the plate 25.

The piston 66 extends outwardly of the cylinder 65 and has on its outer end an eye extension 78 which extends between a pair of plates 79, on the swinging frame B, and is pivotally attached thereto by a pin 80. The plates 79 are applied one to the lower bar section 42 and the other to the upper bar section 43 and are rigidly secured thereto by the bolts 45. The pin 80 extends through one pair of aligned holes 81 in the plates 79 and the eye extension 78 on the piston 66. The pairs of holes 81 are spaced longitudinally of the plates 79.

Obviously, the bars 72 afford a base of reaction for the cylinder 65 when the piston 66 is being moved by fluid introduced into the cylinder 65 under pressure to swing the frame B and thereby move the shearing blade 54 toward the fixed shearing blade 53 and thereby produce shearing action. A long pair of coiled springs 82 are anchored at one of their ends to the bars 72 and attached at their other ends to the plates 79. These springs 82 are located, one on each side of the cylinder 65. As the swinging frame B is moved forwardly by the piston 66, the springs 82 are placed under tension. When fluid pressure in the cylinder 65 is released, the tensioned springs 82 return the swinging frame B and thus retract the movable shearing blade 54.

It will be noted that the post 68 which moves the carrier 58 is located very close to the pivot pin 49 for the swinging frame B and that the cylinder 65 and piston 66 are attached to said frame a relatively long distance from said post and this produces a powerful stroke to the swinging frame B during cutting action of the movable shearing blade 54. The ring 37 affords a support on which the swinging frame B slidably rests.

A gauge to determine the length of a piece of work to be cut by the blades 53 and 54 includes a long rod 83 secured relative to the stationary frame A, extends radially from the axis of the ring 37 and outwardly of said ring. A guide block 84 is slidably mounted on the rod 83 and a second rod 85 is mounted on the guide block 84 for endwise adjustment. The inner end portion of the rod 85 is bent upwardly to afford a stop 86 for a piece of work to be cut. Set screws 87 having threaded engagement with the guide block 84 impinge the rods 83 and 85 and hold the guide block 84 where adjusted on the rod 83 and the rod 85 where adjusted on the guide block 84. The rod 85 may be endwise revised to position the stop 86 a greater distance from the shearing blades 53 and 54.

The drawings illustrate a commercial form of the invention, but it will be understood that the same is capable of certain modifications as to details of construction, arrangement and combination of parts within the scope of the invention herein disclosed.

What I claim is:

1. In a tool of the class described, comprising a vertical supporting base, a pair of spaced fixed arms disposed at one side of said base and connected adjacent one end thereof with means extending to the opposite side of said base, said arms and means being mounted adjacent their connection on one end of said base, a shear mechanism mounted between the spaced free ends of said arms outwardly of said base, said shear mechanism comprising spaced top and bottom plates with a vertical web therebetween, a work passageway in said web, a shear blade fixedly mounted on said web at one side of said passageway, a slide way in the web at the other side of said passageway, a shear blade carrier mounted in said slide way, said pair of spaced fixed arms having a longitudinal series of aligned apertures therethrough which are spaced inwardly from said fixedly and movably mounted shear blades, a pair of spaced lever arms extending between said spaced fixed arms and having aligned apertures therein adapted to register with aligned apertures in said fixed arms, a pin extending through the aligned apertures of said fixed and lever arms and providing a pivotal mounting for said lever arms, means on said lever arms adjacent said pivotal mounting and between said pivotal mounting and the free ends of said arms for engaging said shear carrier to move same, and power means mounted on said means extending to the opposite side of said supporting base and engaging the free ends of said lever arms for operating same on its pivotal mounting on said fixed arms to move said shear blade between such arms.

2. The structure as defined in claim 1, wherein the power means engaging the free ends of the lever arms comprises a piston and cylinder connected between said lever arms and said fixed arms on said supporting base.

3. The structure as defined in claim 1, wherein said spaced lever arms are also provided with a longitudinal series of aligned spaced apertures, and a removable pin extending through aligned apertures in said fixed arms and said lever arms for adjustably connecting the lever arms and the fixed arms to operate said shear blade carrier.

4. The structure as defined in claim 2, wherein said supporting base and fixed arms have other series of apertures and said piston and cylinder assembly being adjustably connected to said other series of apertures.

(References on following page)

References Cited in the file of this patent

UNITED STATES PATENTS

| | | |
|---|---|---|
| 569,281 | Guild | Oct. 13, 1896 |
| 587,362 | Edwards | Aug. 3, 1897 |
| 625,289 | Christie | May 16, 1899 |
| 642,631 | Rothe | Feb. 6, 1900 |
| 986,809 | Derbyshire | Mar. 14, 1911 |
| 1,102,173 | Scoggins | June 30, 1914 |
| 1,729,076 | Laycock | Sept. 24, 1924 |
| 1,765,208 | Cunningham | June 17, 1930 |
| 2,678,097 | Hahn | May 11, 1954 |
| 2,757,733 | Cunningham | Aug. 7, 1956 |